(12) United States Patent
Gerber et al.

(10) Patent No.: US 12,117,035 B2
(45) Date of Patent: Oct. 15, 2024

(54) GLUED-ROD INSERT (GRI) FOR USE IN MASS TIMBER CONSTRUCTION

(71) Applicant: F3 Timber Technologies Inc., Abbotsford (CA)

(72) Inventors: Adam Reynold Gerber, Vancouver (CA); Nathan Samuel Bergen, Abbotsford (CA)

(73) Assignee: F3 Timber Technologies Inc., Abbotsford (CA)

( * ) Notice: Subject to any disclaimer, the term of this patent is extended or adjusted under 35 U.S.C. 154(b) by 1049 days.

(21) Appl. No.: 16/933,126

(22) Filed: Jul. 20, 2020

(65) Prior Publication Data

US 2021/0025436 A1 Jan. 28, 2021

Related U.S. Application Data (60) Provisional application No. 62/877,422, filed on Jul. 23, 2019.

(30) Foreign Application Priority Data

Jun. 17, 2020 (CA) ...................................... 3083882

(51) Int. Cl.
*F16B 39/22* (2006.01)
*B27G 11/00* (2006.01)

(52) U.S. Cl.
CPC .......... *F16B 39/225* (2013.01); *B27G 11/005* (2013.01)

(58) Field of Classification Search
CPC ....... B27G 11/00; B27G 11/005; F16B 13/14; F16B 39/225

USPC .......................................................... 144/347
See application file for complete search history.

(56) References Cited

U.S. PATENT DOCUMENTS

| | | | | |
|---|---|---|---|---|
| 2,855,970 | A * | 10/1958 | Neuschotz | F16B 39/06 411/110 |
| 4,094,222 | A | 6/1978 | Lang et al. | |
| 4,098,166 | A | 7/1978 | Lang | |
| 5,082,405 | A | 1/1992 | Witten | |
| 5,263,804 | A * | 11/1993 | Ernst | F16B 13/141 411/258 |
| 6,403,678 | B1 * | 6/2002 | Surjan | C08G 59/18 523/211 |
| 2006/0210374 | A1 | 9/2006 | Calandra et al. | |

(Continued)

FOREIGN PATENT DOCUMENTS

| | | |
|---|---|---|
| DE | 19943962 C1 | 8/2001 |
| DE | 10100733 C1 | 7/2002 |

(Continued)

OTHER PUBLICATIONS

Western Archrib, "Rod Install Procedure using West System Epoxy", undated (received by Applicant on Feb. 4, 2019), 12 pages, Edmonton Alberta, Canada.

*Primary Examiner* — Matthew Katcoff (57) ABSTRACT

A glued rod insert (GRI) for use in mass timber construction including a generally cylindrical collar having: an internal concentric threaded bore for receiving a threaded rod, circumferential ridges or ribs on the exterior for securely seating within a hole drilled in wood, and a relief channel for excess glue. A method using the glued rod insert (GRI) to install threaded rods in wood components in mass timber construction.

12 Claims, 7 Drawing Sheets

(56) References Cited

U.S. PATENT DOCUMENTS

| | | | | |
|---|---|---|---|---|
| 2009/0016813 A1* | 1/2009 | Gonzalez | ............ | F16B 25/0026 |
| | | | | 403/267 |
| 2017/0363137 A1* | 12/2017 | Markowicz | ........... | B29C 65/561 |
| 2017/0370396 A1* | 12/2017 | Kitajima | ............... | F16B 37/044 |

FOREIGN PATENT DOCUMENTS

| | | | | |
|---|---|---|---|---|
| DE | 102012104938 A1 | | 12/2013 | |
| EP | 0936361 A1 | | 2/1998 | |
| GB | 2549084 A | * | 10/2017 | ............. F16B 13/02 |

* cited by examiner

Fig 9

GLUED-ROD INSERT (GRI) FOR USE IN MASS TIMBER CONSTRUCTION

CROSS REFERENCE TO RELATED APPLICATIONS

This application claims the benefit of U.S. Provisional Patent Application U.S. 62/877,422, filed 23 Jul. 2019, and claims the benefit of a Canadian Patent Application, tiled Glued-Rod Insert (GRI) For Use In Mass Timber Construction, filed 17 Jun. 2020.

FIELD OF THE INVENTION

The present invention relates to the field of glued-in rods in mass timber construction.

BACKGROUND OF THE INVENTION

Mass timber construction is a relatively new particular type of "heavy timber construction", involving the construction of buildings with large-volume and large-cross-section timber, including a wide range of engineered wood products such as CLT, LSL, LVL, PSL, and MPP.

The use of glued-in rods is known generally in construction including in mass timber construction. A hole is formed in a body (e.g., concrete, stone or wood), and a rod (typically steel and having a thread on at least the portion projecting from the hole) is positioned in the hole and permanently secured in position in the hole by filling the remainder of the volume of the hole with a hardenable adhesive material, typically a two-part epoxy. The protruding threaded portion of the rod is used, with a threaded nut (and typically, one or more washers), to secure the body with the protruding threaded portion of the rod to another component, e.g., a steel plate or steel assembly.

An example of the use of glued-in rods in mass timber construction is at the base of a timber column supported by a concrete foundation or slab. An exemplary typical timber column for this purpose may have a 12"×12" cross section, be roughly 14' tall, and weigh a few hundred pounds. Connecting such a timber column directly to a concrete foundation is not practical. Typically, a component is interposed between the concrete foundation and the timber column, generally a steel plate or pedestal. A suitable pedestal may comprise a ¾" thick plate that is 12" wide×12" long, welded to a hollow structural section (HSS, e.g., square or rectangular tube) with a cross section of 6"×6" and being 8" tall. A second similar ¾" thick 12"×12" plate is welded on top of the HSS. The plates on top and bottom of the HSS are drilled with four holes each, sized to accept ¾" diameter threaded rods.

Four threaded rods embedded in the concrete (either cast in place when the concrete is poured or glued in holes created after the concrete has cured) and positioned so as to protrude vertically from the concrete foundation, are used to affix the pedestal to the concrete foundation. Prior to positioning the pedestal at the desired location on the concrete foundation, it is common to thread nuts onto the rods protruding from the concrete and to position the nuts at a desired elevation. In this way, when the pedestal is positioned, it is supported by the pre-threaded nuts at a desired elevation in a level orientation. The pedestal is secured to the concrete foundation by threading four more nuts on top of the lower pedestal plate. With the pedestal thus secured in the correct location and elevation, the timber column is placed on top of the pedestal. Glued-in rods projecting from the base end of the timber column protrude through the top plate of the pedestal and are secured by nuts tightened to abut the bottom of the upper pedestal plate.

A threaded rod is glued in a timber column in a manner similar to how rods are glued in concrete. A hole is drilled into the end of the column, typically at least ⅛" larger in diameter than the threaded rod; epoxy is placed in the hole; and the threaded rod is inserted into the hole.

Air pockets in the epoxy are undesirable. Curing/setting of an epoxy is generally an exothermic reaction. Heating of an air pocket causes the gas to expand which may displace the threaded rod (e.g., push the threaded rod out of the hole, resulting in too much protrusion) and/or displace the epoxy (i.e., force it from the hole), both of which may produce less than optimal bonding between the rod and hole wall. An unreleased air pocket leading to a void in the cured epoxy and sub-optimal bonding There are several challenges when properly installing threaded rods in epoxy filled holes, and no practical way to inspect them after the epoxy has cured.

A number of different epoxies are used for this type of connection, with varying viscosities. Higher viscosity epoxies are better at resisting the effects of gravity, however, they do not flow as readily which may result in undesirable air pockets. For that reason, lower viscosity epoxies are generally used, but while they may be better at fully encapsulating the threaded rod (with no or fewer voids within the hole), they are prone to self-leveling which means they tend to flow out of a horizontal hole.

The optimal position for preventing epoxy from flowing out of the holes would of course be with the holes vertical and opening upwards. However, due to the usual length and weight of a typical mass timber construction component (e.g., a column), when installing glued-in rods parallel to grain, it is rarely practical to position the component with the holes vertical and opening upwards. Thus, in order to epoxy rods into the end of a column, typically the column must be closer to horizontal than vertical. A common approach is to tilt the columns, for example up to a 30-degree angle from horizontal. However, as the timbers tend to be heavy and cumbersome, even such tilting tends to be awkward and time consuming. As well, a 30-degree tilt will not prevent some of a lower viscosity epoxy from flowing out of the hole, and it is often necessary to create makeshift temporary dams at each hole (e.g., with a plastic sheet material, to which epoxy does not bond, secured in place with tape) to minimize flow of epoxy from the holes.

Another challenge with installing glued rods is keeping the threaded rods in the correct location, both centered in the hole and in the correct relationship to the edge of the column and to the other threaded rods. To facilitate the flow of the epoxy around the threaded rod in the hole (thus reducing voids in the epoxy), the diameter of the hole for receiving the threaded rod is typically ⅛" to 3/16" larger than the diameter of the threaded rod. In a horizontal (or tilted) orientation, gravity tends to pull the threaded rods to the side of the hole closest to the ground. The common approach to maintaining the desired alignment of the threaded rods is to create a custom plywood jig with accurately positioned drilled holes sized for a snug fit for the threaded rods. The plywood jig is secured 4" to 6" away from the end of the column by temporary blocks screwed to the end of the column. Even with a properly made plywood jig, care is needed to position and secure it correctly to achieve and maintain the desired orientation of the rods. Typical tolerance in the mass timber industry is +/−1-2 mm. Connecting hardware ought to match the tolerances the material it is connecting to in order for buildings to be constructed efficiently. Failure to install rods accurately (e.g., square and properly located) adversely affects tolerances on site, even with oversized holes in baseplates.

The typical installation procedures described above are labor intensive. Based on a timed test of the installation of six threaded rods in the end of a timber column, it is understood that on average it takes between 15 and 20 minutes for one person to install one glued-in threaded rod.

SUMMARY OF THE INVENTION

In one aspect, the present invention provides an apparatus for use in installing a threaded rod and hardenable adhesive material in a hole in a wood component in mass timber construction, the apparatus including: a substantially cylindrical outer profile; an internal bore configured to permit insertion therethrough of a threaded rod while impeding linear withdrawal of the threaded rod; and a relief channel, wherein, in use, the apparatus is positioned in a hole formed in a wood component adjacent the hole opening, hardenable adhesive material is introduced into the hole via the internal bore, the threaded rod is inserted through the internal bore into the hole, whereby any excess hardenable adhesive material displaced by the threaded rod flows out of the hole via the relief channel.

The internal bore may have threading, whereby: the permitted insertion therethrough of a threaded rod involves threaded rotation of the threaded rod; and the impeding of linear withdrawal of the threaded rod is provided by the internal bore threading.

The apparatus may include one or more projections from the substantially cylindrical outer profile, that in use provide frictional engagement with the hole formed in the wood component. The one or more projections may be resiliently deformable. The one or more projections may include one or more ridges extending substantially circumferentially about the substantially cylindrical outer profile, whereby, in use, engagement between the one or more ridges and the hole impedes flow of hardenable adhesive material therebetween.

The relief channel may include a groove on the exterior of the substantially cylindrical outer profile. The relief channel may include: a longitudinal groove on the exterior of the substantially cylindrical outer profile and extending the length of the substantially cylindrical outer profile; and a radial notch extending from between an end of the longitudinal groove and the internal bore.

The apparatus may comprise a synthetic polymer. The synthetic polymer may be nylon.

In another aspect, the present invention provides a method for installing a threaded rod in a wood component in mass timber construction, the method including: forming a hole in the wood component; obtaining an apparatus comprising: a substantially cylindrical outer profile, an internal bore configured to permit insertion therethrough of a threaded rod while impeding linear withdrawal of the threaded rod, and a relief channel; positioning the apparatus in the hole adjacent the hole opening; introducing a hardenable adhesive material into the hole via the internal bore; and inserting a threaded rod through the internal bore into the hole.

Forming the hole in the wood component may include: forming a threaded rod receiving bore; and forming an apparatus receiving bore at the hole opening, the apparatus receiving bore having a diameter larger than the rod receiving bore.

Inserting the threaded rod through the internal bore into the hole, may involve threading rotation of the threaded rod.

DETAILED DESCRIPTION WITH REFERENCE TO THE DRAWINGS

As shown in the drawings, embodiments of the present invention include a glued-rod insert 100 (at times identified herein as GRI) for use in securing a threaded rod 102 in a rod-receiving hole 104, comprising a rod-receiving bore 106, a GRI seat 108 and a GRI seat shoulder, formed in a wood component 112, using a glue compound 114.

The glued-rod insert 100 embodiment shown in the drawings comprises a cylindrical collar body 120 having: an inner end 122, an outer end 124, an internal concentric threaded bore 126 extending from the inner end 122 to the outer end 124, for threaded engagement with a threaded rod 102; projecting circumferential ridges 128 (six such ridges 128 in the embodiment shown in the drawings) spaced apart along the length of the collar body 120; and a relief channel 130 extending from the inner end 122 to the outer end 124.

Optionally, to facilitate insertion of the inner end 122 into a GRI seat 108 the inner end 122 may have a circumferential chamfer or bevel (not shown in the drawings).

The ridges 128 are resiliently deformable. In use, the ridges 128 engage the wall of the GRI seat 108 so as to both secure the glued-rod insert 100 in position in the GRI seat 108, and act as a barrier to passage of the glue compound 114 between the outside of the collar body 120 and the side wall of the GRI seat 108. Other shapes and arrangements of projections about the circumference of the collar body 120 may also be suitable, for example, "barbed" projections (i.e., angled to readily permit insertion while resisting withdrawal), in the form of circumferential projections (continuous or discontinuous), discrete projections, and combinations of circumferential projections and discrete projections.

The relief channel 130 comprises a longitudinal groove 140 extending the length of the collar body 120 and, at the inner end 122, a radial notch 142 extending between the outside of the collar body 120 and the bore 126. In use, the inner end 122 may abut the GRI seat shoulder 110, in which case, at least a portion of the radial notch 142 will remain unblocked by the GRI seat shoulder 110. In the embodiment shown in the drawings, the longitudinal groove 140 and radial notch 142 are rectangular in cross section. However, the cross-sectional configuration of the longitudinal groove 140 and radial notch 142 need not be rectangular.

In an exemplary embodiment of the glued-rod insert 100 configured for a ¾" threaded rod 102, the collar body 120 is 50 mm long and has an outer diameter of 28 mm OD; the ridges 128 project 1 mm from the outside of the collar body 120 and are spaced apart one from the other 6 mm on center; and the cross-sectional dimensions of the longitudinal groove 140 are 2 mm×2 mm.

Figures 1, 2, 3, 4:
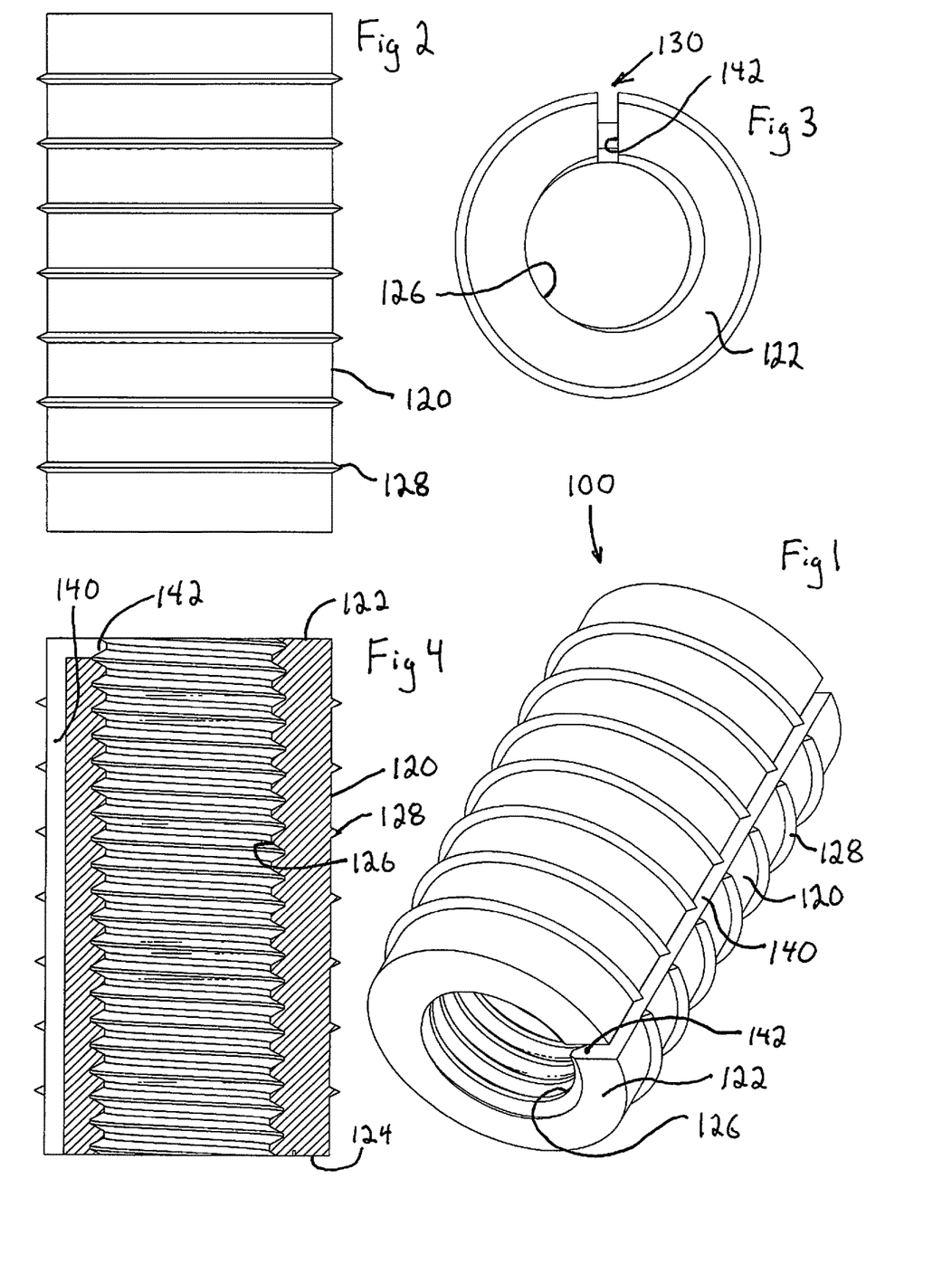
FIG. 1 is perspective view of an embodiment of a glued-rod insert (GRI) embodiment of the present invention.
FIG. 2 is a side elevation view of the embodiment of FIG. 1.
FIG. 3 is a top plan view of the embodiment of FIG. 1.
FIG. 4 is a side elevation sectional view of the embodiment of FIG. 1. with the section cut plane bisecting the relief channel.
Figure 5:
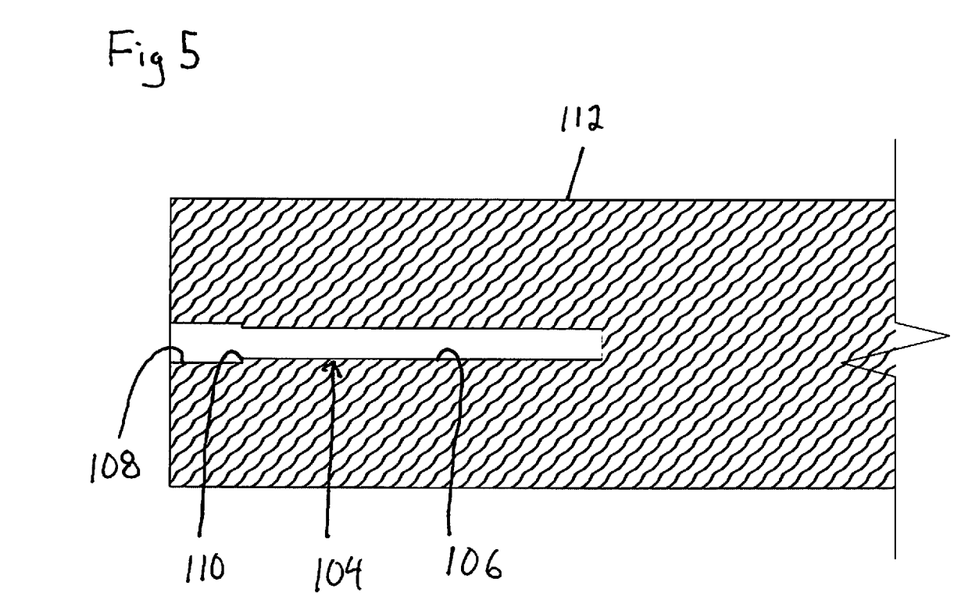
FIG. 5 is a schematic side elevation sectional view of a wood component in which a rod-receiving hole has been created.
Figure 6:
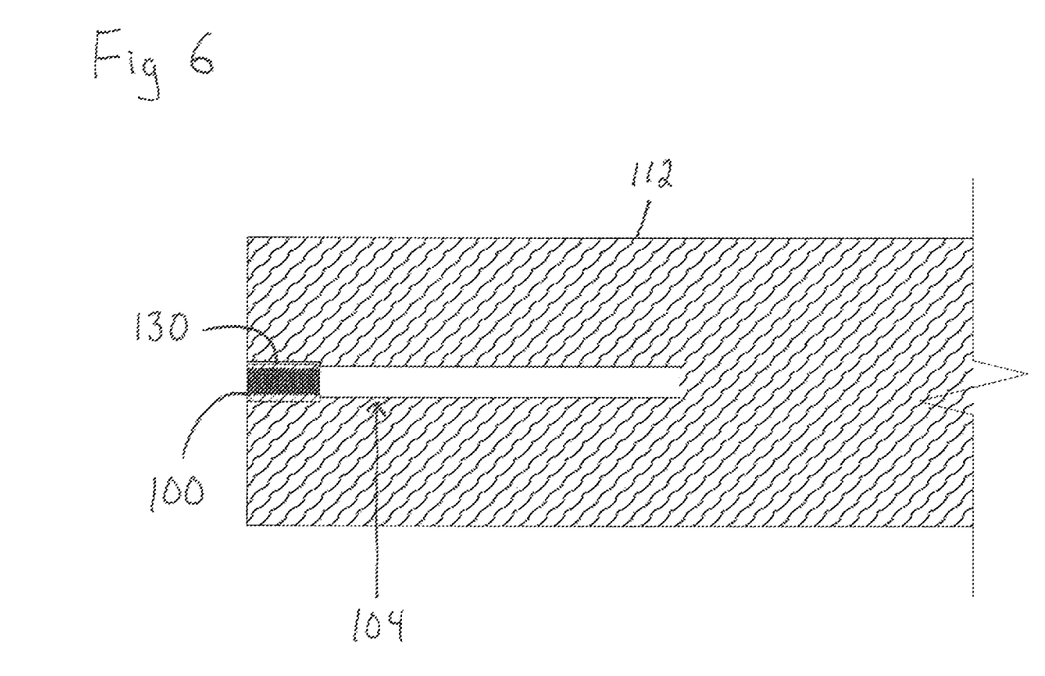
FIG. 6 is a schematic side elevation sectional view of the wood component of FIG. 5, showing the glued-rod insert (GRI) embodiment of FIG. 1, in position in the rod-receiving hole.
Figure 7:
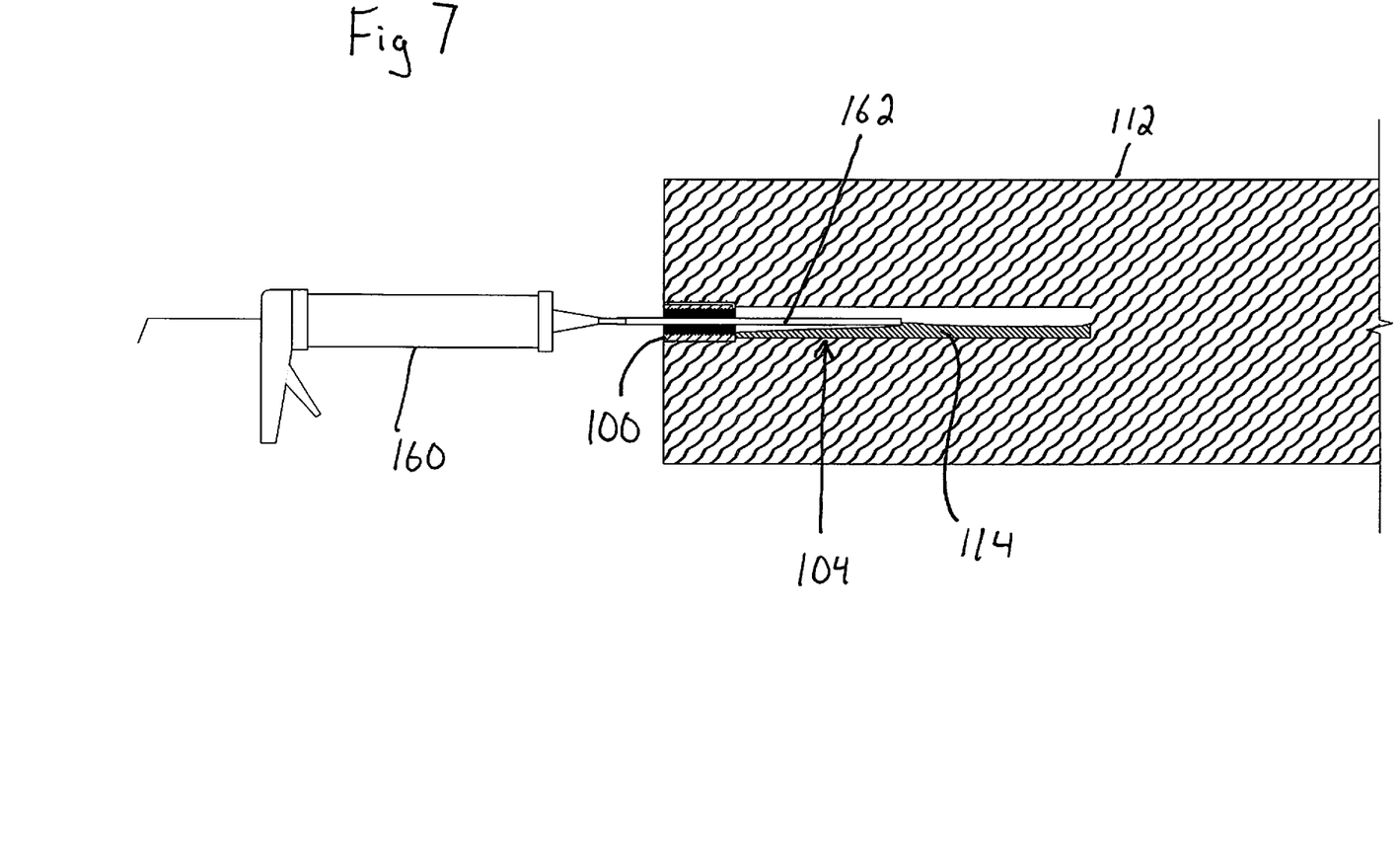
FIG. 7 is a schematic side elevation partially sectional view comprising the elements of FIG. 6, and showing a glue compound being dispensed into the rod-receiving hole.
Figure 8:
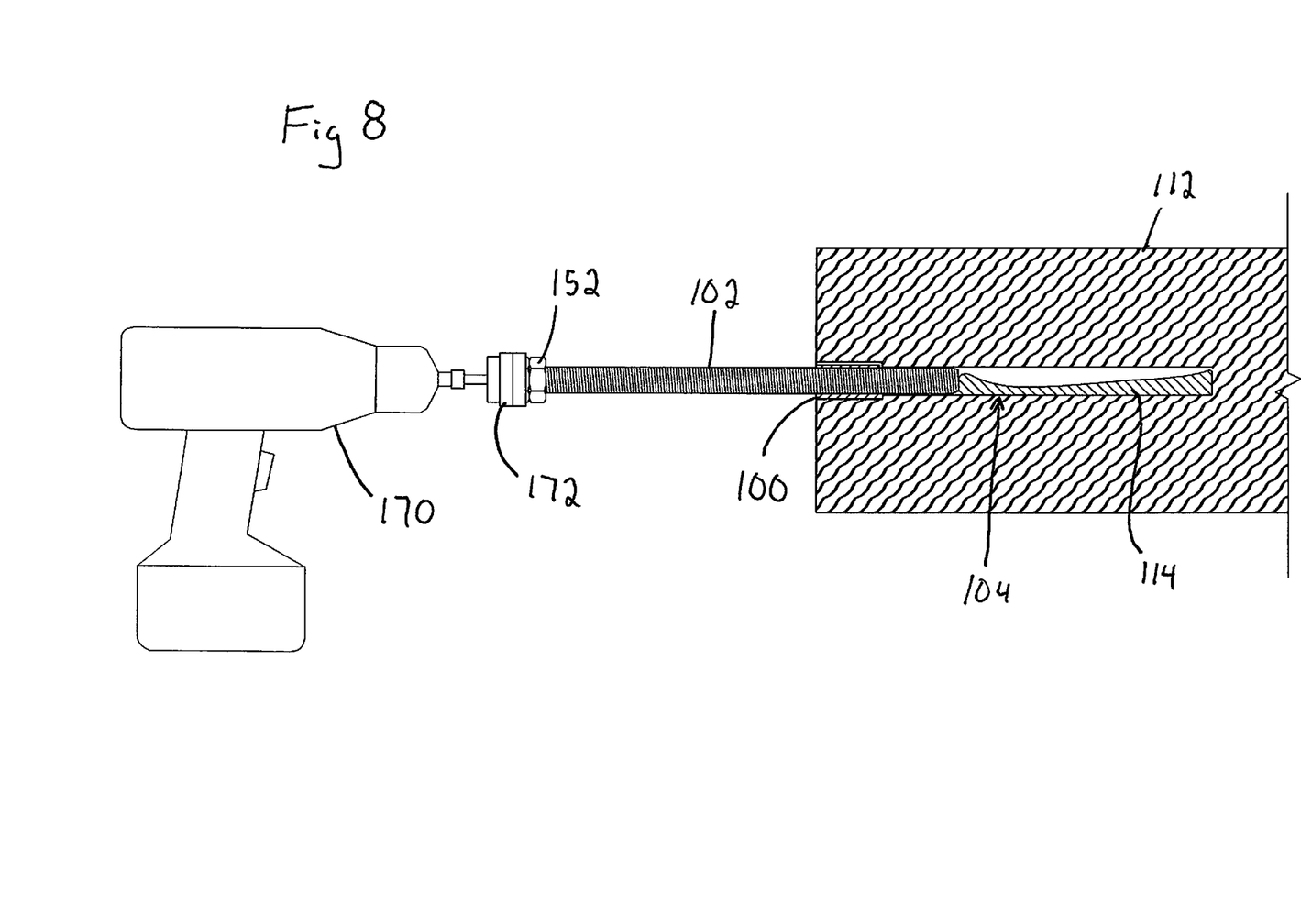
FIG. 8 is a schematic side elevation partially sectional view comprising the elements of FIG. 7, and showing a threaded rod being inserted.
Figure 9:
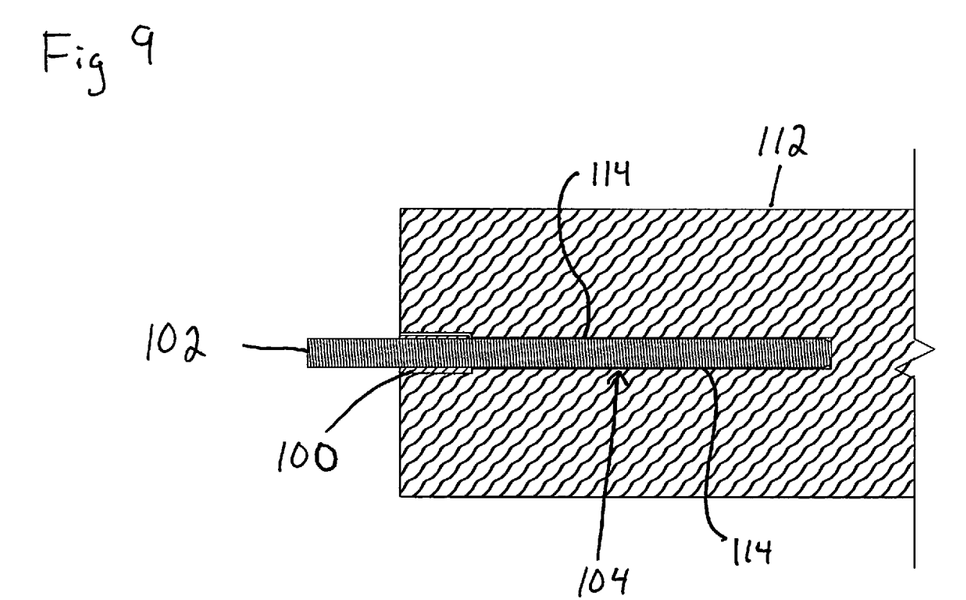
FIG. 9 is a schematic side elevation partially sectional view showing the glued-rod insert (GRI), threaded rod and glue compound installed in rod-receiving hole.
Figure 10:
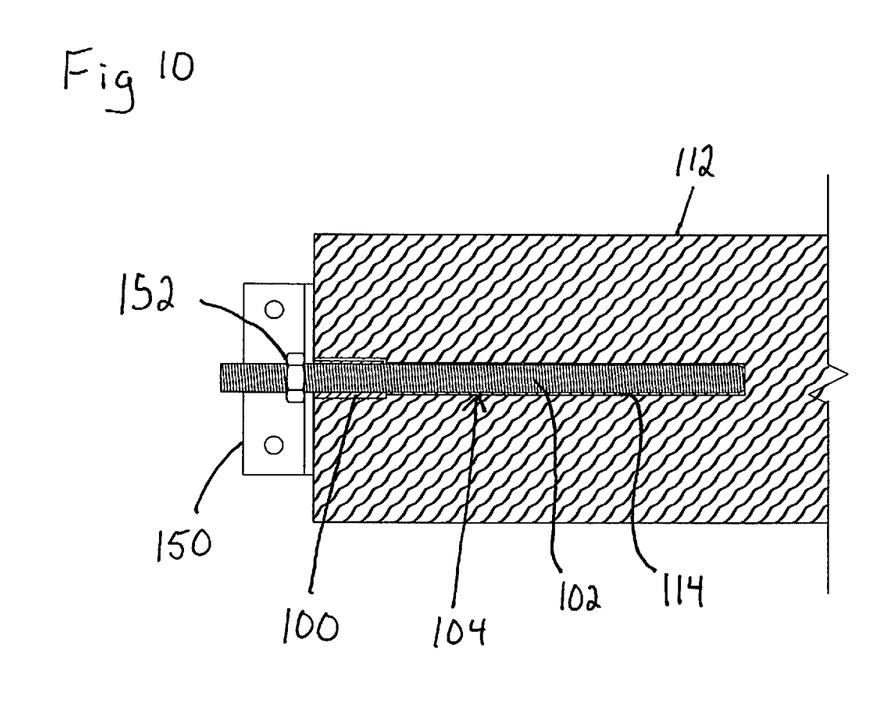
FIG. 10 is a schematic side elevation partially sectional view comprising the elements of FIG. 9, shown in use attached to a construction component after the glue compound has set.

As shown in the drawings, installation and use of the glued-rod insert 100, threaded rod 102 and glue compound 114 includes: creating the rod-receiving hole 104 (FIG. 5); inserting the glued-rod insert 100 into the GRI seat 108 (FIG. 6); dispensing the glue compound 114 into the rod-receiving bore 106 (FIG. 7); and inserting the threaded rod 102 through the glued-rod insert 100 into the rod-receiving bore 106 (FIGS. 8 and 9). Once the glue compound has cured/set, the thus-secured threaded rod 102 may be used to attach the wood component 112 to another construction component 150 with a nut 152 (FIG. 10).

Creating the rod-receiving hole 104 (FIG. 5) may be accomplished by separately drilling the rod-receiving bore 106 and the GRI seat 108. Alternatively, and desirably in terms of speed and accuracy, a single boring tool combining a rod-receiving bore drill, a counterbore cutter attached thereto for creating the GRI seat, and a depth guide, could be used to make the rod-receiving hole 104 with a single drilling action.

Inserting the glued-rod insert 100 into the GRI seat 108 (FIG. 6) typically involves tapping the glued-rod insert 100 into place with a mallet (e.g., a rubber mallet). With a timber in a horizontally extending, or tilted, orientation it is of course preferable to insert the glued-rod insert 100 with the relief channel 130 positioned at the upper side of the GRI seat 108 (i.e., furthest away from the ground), so as to bleed air and excess epoxy properly.

Dispensing the glue compound 114 into the rod-receiving bore 106 (FIG. 7) involves use of a glue dispensing device 160 with a dispensing tip 162 (preferably an elongate tip as indicated in FIG. 7). In FIG. 7, the glue dispensing device 160 and dispensing tip 162 are shown in a simplified stylized manner. The glue compound 114 is typically a two-part epoxy and thus a suitable glue dispensing device 160 comprises features for holding the two parts separately, and mixing same as part of the dispensing operation.

Inserting the threaded rod 102 through the glued-rod insert 100 into the rod-receiving bore 106 (FIGS. 8 and 9) involves rotating the threaded rod 102 through the glued-rod insert 100. Preferably, rotating the threaded rod 102 through the glued-rod insert 100 is accomplished by creating rotational engagement between a power driver 170 (e.g., a drill) and the threaded rod 102, and using the power driver 170 to rotate the threaded rod 102 until the desired penetration (generally, full insertion so as to abut the inner end of the rod-receiving bore) is achieved.

As indicated in FIG. 8, the rotational engagement between the power driver 170 and the threaded rod 102 may be achieved by locking two nuts 152 one against the other at an end of the threaded rod 102 (so as to impede rotation of the nuts 152 relative to the threaded rod 102); and then using a conventional nut driver 172 (e.g., a hex socket) connected to the power driver 170 to rotate the nuts 152. Alternatively, a custom rod driver (not shown) configured for direct threaded engagement with the threaded rod 102, and wrenchless release, could be used.

The power driver 170 caused rotation and full insertion, ensure full mixing of the two parts of two-part epoxy, and assist in break up and release of any air pockets. However, manual rotation of threaded rod 102 (e.g., with a conventional wrench, socket driver, specialize hand crank etc.) may also be used.

A prototype glued-rod insert/GRI 100 was tested using a piece of 8"×8" Douglas fir post. The two-part epoxy used was Simpson™ AT XP in a 12.5 us.fl.oz. caulking gun style tube. The threaded rod was ⅝" galvanized rod 16" long. The rod-receiving bore 106 was drilled 12" deep with a ⅞" drill bit. The GRI seat was created by drilling with a 1" bit to a depth of 2". The rod-receiving hole 104 was thoroughly blown out with compressed air. The ambient air temp was approx. 12 degrees celsius.

The rod-receiving hole 104 was calculated as having an approx. volume of 7.57 cu inch or 4.19 us.fl.oz. The glued-rod insert 100 and threaded rod 102 were calculated to have a volume of approximately 4.63 cubic inch or 2.57 us.fl.oz. The difference, i.e., the volume between the wall of the rod-receiving bore 106 and the threaded rod 102, being approximately 1.62 us.fl.oz.

The prototype glued-rod insert/GRI 100 was inserted into the GRI seat 108 (tapped in with a mallet) so as to bring the outer end 124 flush with the end plane of the timber. Approximately 1.62 us.fl.oz. of the epoxy was pumped into the rod-receiving bore 106 hole via the threaded bore 126. Double nuts 152 were locked against each other on one end of the threaded rod 102. Using a cordless ½" impact drill, the threaded rod 102 was driven/spun into the rod-receiving bore 106 via the threaded bore 126 until the threaded rod 102 contacted the bottom of the rod-receiving bore 106. Insertion of the threaded rod 102 caused epoxy to be displaced and some excess epoxy flowed from the relief channel 130. The excess epoxy was removed with a rag.

Prototype testing suggests the following preferred configurations and relative dimensions. The GRI seat 108 diameter is preferably about ⅜" larger than the diameter of the threaded rod 102 and the outer diameter of the collar body 120 should be made to fit tight in the GRI seat 108 (the ridges 128 being deformable). Metric dimensions (i.e., millimeters or mm) are the preferred unit of measure for the outer diameter of the collar body 120 because most of the CNC machinery used around the world for detailing timbers are made in Europe and use metric drill sizes. This requires some adjustment in North America where readily available threaded rods tend to be sized in inches. In prototypes, the calculated outer diameter of the collar body 120 is metric and rounded to the nearest millimeter smaller than ⅜" large than the nominal diameter of the threaded rod 102. For example, ⅜" larger than a ¾" threaded rod is 1⅛" or 28.575 mm, for which the outer diameter of the collar body is 28 mm. It is understood that, should the GRI seat 108 have a diameter of 1⅛" rather than 28 mm, the ridges 128 (which project 1 mm, thus adding 2 mm to total diameter) will still work to retain the glued-rod insert 100 in the GRI seat 108, and provide an adequate seal between the collar body 120 and the GRI seat 108.

The GRI centers and orients the threaded rods in the holes without the need for a custom jig. Based on a timed test, the inventors understand that use of the GRI makes it possible to fully install a threaded rod in an average of 3 to 4 minutes.

Use of the GRI preferably involves rotation of the threaded rod as it engages with the epoxy within the hole. It is understood that this rotation action promotes the release of air pockets that might be present as well as coats the threaded rod in a uniform manner. As well, should an air pocket not be released with the use of the GRI, the center bore of the GRI is threaded and the GRI is tight in the hole so the GRI will tend to resist any outward pressure associated with an air pocket.

The inventors understand that the epoxy free zone provided by the GRI in the vicinity of the hole opening is beneficial in that it provides a yielding zone (i.e., about 50 mm at the opening of the hole). The most common way for glued rods to fail is in shear and the yielding zone is understood to enable the threaded rod to fail under shear in a more predictable manner. The GRI, being approximately ⅜" diameter larger than the threaded rod, creates approximately 3/16" of thickness between the threaded rod and the wood on all sides of the rod. For the purpose of the yielding zone, the GRI is preferably made of a substantially rigid material but with more give than typically provided by the epoxy and wood surrounding the rod. Nylon has been tested and appears to be suitable, however a variety of materials could be used. The GRI being softer than both steel and the epoxy/wood combination encasing the rest of the threaded rod allows some lateral deformation of the portion of the threaded rod, thus avoiding an immediate shear condition should the joint be laterally stressed. A more ductile, less sudden failure is understood to be the result. It is understood that the 50 mm yielding zone may also enable the threaded rod to fail in tension more predictably by allowing space for plastic/ductile deformation of the threaded rod.

The GRI can be sized to suit any diameter and thread pitch of threaded rod. The length of the GRI can also be adjusted to optimize the yielding zone.

In the exemplary embodiment shown in the drawings, the threading within the threaded bore 126 is continuous along entire length of the threaded bore 126. This is understood to be preferred in terms of mechanical engagement with the threaded rod 102 and displacement of any glue compound 114 that may have been inadvertently deposited within the threaded bore 126. However, the threading within the threaded bore 126 could extend only part of the length of the threaded bore 126, or be discontinuous. Alternatively, the bore 126 could have features other than threads for engaging a threaded rod 102, for example, an array of suitably configured projections.

A possible alternative embodiment of the glued-rod insert includes a break away material partially closing the threaded bore at the inner end and defining an opening offset from the center of the threaded bore towards the radial notch and configured to permit insertion of a glue dispensing tip. The material is configured to impede outward flow of the epoxy and to break away responsive to the insertion of a threaded rod (preferably with the break away in a predetermined desired manner, e.g., as controlled by scoring in the material).

The scope of the claims should not be limited by the preferred embodiments set forth in the examples, but should be given the broadest interpretation consistent with the description as a whole.

What is claimed is:

1. An insert apparatus for use in installing a threaded rod and hardenable adhesive material in a hole in a wood component in mass timber construction, the insert apparatus comprising:
    a body having an exterior surface and defining an inner end and an outer end that is opposite the inner end along a longitudinal axis of the body;
    an internal bore extending through the body from the inner end to the outer end, the internal bore being configured to permit insertion therethrough of a threaded rod while engaging the threaded rod to impede linear withdrawal of the threaded rod; and
    a relief channel extending the entire length of the body from the inner end to the outer end;
    wherein with the insert apparatus positioned in the hole adjacent an opening in the hole, and upon the hardenable adhesive material being introduced into the hole via the internal bore, the threaded rod is insertable through the internal bore into the hole and the relief channel is operable to permit any excess hardenable adhesive material displaced by the threaded rod to flow out of the hole via the relief channel.

2. The insert apparatus of claim 1, wherein the internal bore has threading and wherein the permitted insertion therethrough of the threaded rod involves threaded rotation of the threaded rod, and the impede linear withdrawal of the threaded rod is provided by the internal bore threading.

3. The insert apparatus of claim 1, further comprising one or more projections from the exterior surface that to provide frictional engagement with the hole formed in the wood component.

4. The insert apparatus of claim 3, wherein the one or more projections are resiliently deformable.

5. The insert apparatus of claim 3, wherein the one or more projections comprise one or more ridges extending substantially circumferentially about the exterior surface, wherein the engagement between the one or more ridges and the hole impedes flow of the hardenable adhesive material therebetween.

6. The insert apparatus of claim 1, wherein the relief channel comprises a groove defined on the exterior surface.

7. The insert apparatus of claim 1, wherein the relief channel comprises a longitudinal groove on the exterior surface and a radial notch extending from an end of the longitudinal groove and the internal bore.

8. The insert apparatus of claim 1, wherein the apparatus comprises a synthetic polymer and wherein upon hardening of the hardenable adhesive material to provide structural support for the threaded rod within the hole, the insert apparatus being of a softer material than the hardened hardenable adhesive material provides a yielding zone free of hardened hardenable adhesive material to allow lateral deformation of a threaded rod portion within the insert apparatus.

9. The insert apparatus of claim 8, wherein the synthetic polymer is nylon.

10. A method for installing a threaded rod in a wood component in mass timber construction, the method comprising:
    forming a hole in the wood component, the hole defining a hole opening;
    obtaining an insert apparatus comprising: a body having an exterior surface and defining an inner end and an outer end that is opposite the inner end along a longitudinal axis of the body, an internal bore extending through the body from the inner end to the outer end, the internal bore being configured to permit insertion therethrough of a threaded rod while engaging the threaded rod to impede linear withdrawal of the threaded rod, and a relief channel extending the entire length of the body from the inner end to the outer end;

positioning the insert apparatus in the hole adjacent the hole opening;

introducing a hardenable adhesive material into the hole via the internal bore; and inserting the threaded rod through the internal bore into the hole and into the hardenable adhesive material within the hole, wherein any excess hardenable adhesive material that is displaced by the threaded rod may flow out of the hole via the relief channel.

11. The method of claim 10, wherein forming the hole in the wood component comprises:

forming a threaded rod receiving bore; and forming an insert apparatus receiving bore at the hole opening, the insert apparatus receiving bore having a diameter larger than the threaded rod receiving bore and being operable to receive the insert apparatus.

12. The method of claim 10, wherein inserting the threaded rod through the internal bore into the hole comprises threading rotation of the threaded rod.

\* \* \* \* \*